April 19, 1955  C. F. BISHOP  2,706,371
GRAIN DRYER FOR COMBINES
Filed Sept. 10, 1951  4 Sheets-Sheet 1

INVENTOR.
Charles F. Bishop
BY
Wayland D. Keith
HIS AGENT

April 19, 1955     C. F. BISHOP     2,706,371
GRAIN DRYER FOR COMBINES
Filed Sept. 10, 1951     4 Sheets-Sheet 2
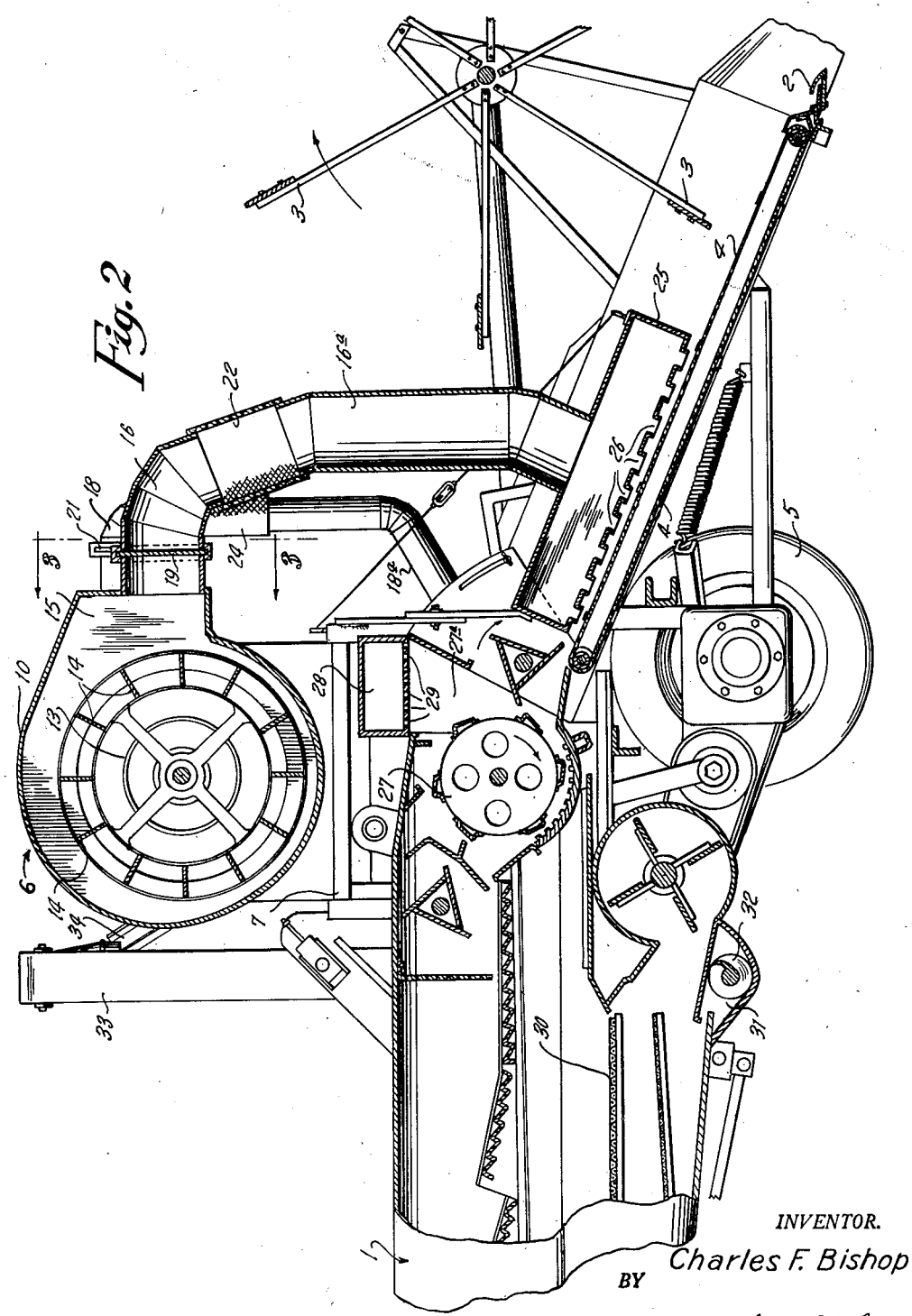
INVENTOR.
Charles F. Bishop
BY Wayland D. Keith
HIS AGENT April 19, 1955

C. F. BISHOP 2,706,371

GRAIN DRYER FOR COMBINES

Filed Sept. 10, 1951

INVENTOR.
Charles F. Bishop
BY
Wayland D Keith
HIS AGENT

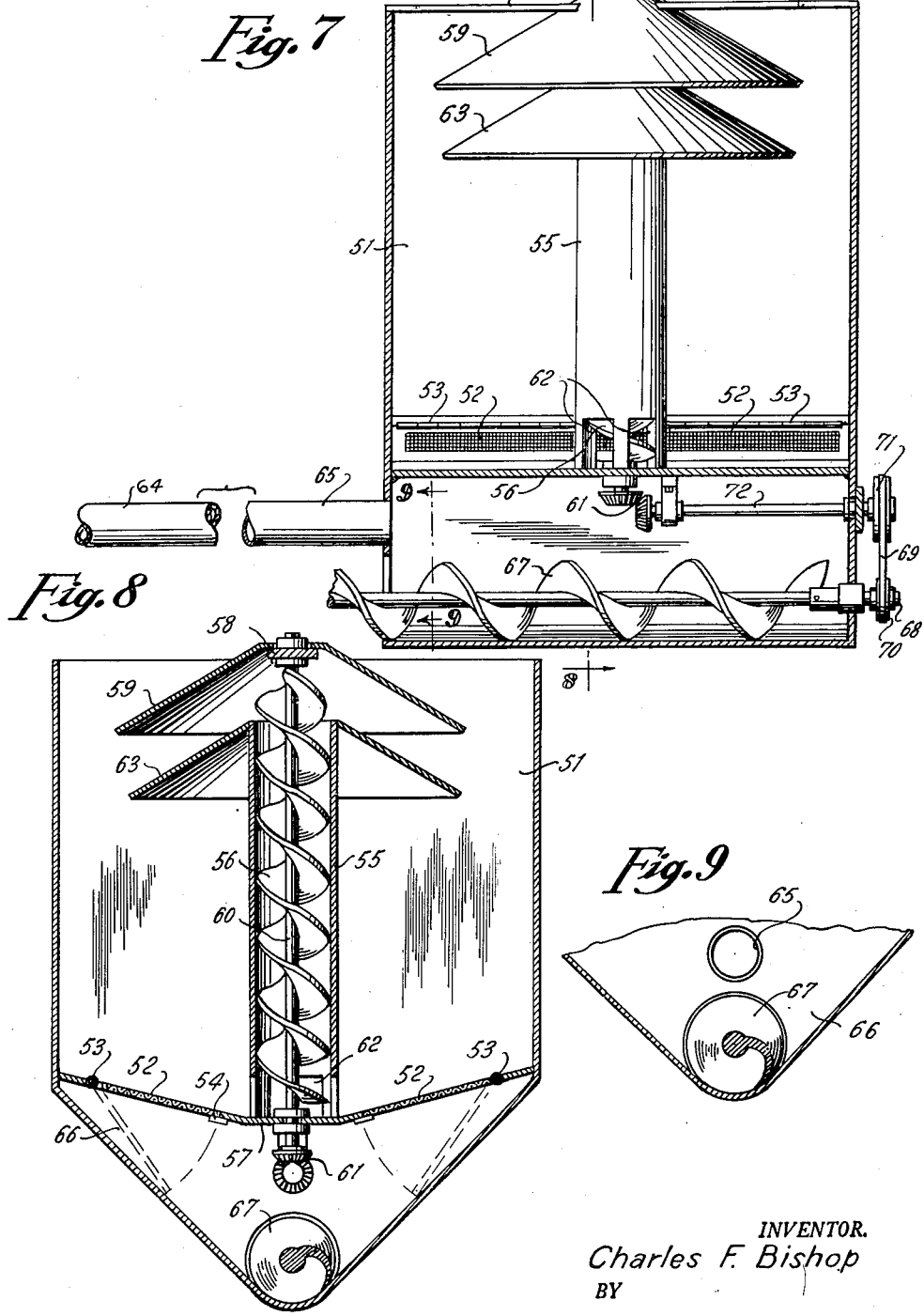

United States Patent Office 2,706,371
Patented Apr. 19, 1955

2,706,371

GRAIN DRYER FOR COMBINES

Charles F. Bishop, Dallas, Tex.

Application September 10, 1951, Serial No. 245,886

7 Claims. (Cl. 56—20)

This invention relates to improvements in grain dryer for combines and more particularly to drying or dehydrating equipment for use with combines to lower the moisture content of grains or crops that are being harvested or threshed.

In the harvesting of grains and other crops that require cutting and threshing, such as wheat, oats, maize, grass seeds and the like with a machine of the character known as a combine, it has heretofore been impossible to thresh the grain from the head when heavy or light surface moisture was present, which meant that on days when the relative humidity was high or after sunset, or before the sun had dried off the surface moisture in the morning, the ordinary harvester or combine could not be used successfully without the loss of crop. The presence of hygroscopic moisture in the grain has also been a determining factor in when the grain could be successfully harvested, since the hygroscopic moisture affects the marketing and storage of the crop.

In the present invention, the crop may be dried as it is harvested, which makes possible the operation of the combine twenty four hours a day, regardless of the moisture content, surface moisture or humidity conditions. The present machine can be used in any weather, thereby giving the user about three times the available working time, as has heretofore been possible.

The present device removes the surface moisture, and at the same time removes the hygroscopic moisture, thus the operator has the option of selecting the time he wants to harvest and is able to dry the crop as it is harvested.

An object of this invention is to provide a crop drying system for use with combines and the like for removing both the surface moisture and for lowering the hygroscopic moisture content, so that the crop may be harvested during adverse weather and humidity conditions and before the crop has ripened sufficiently to shatter or waste.

Another object of this invention is to provide a crop drying device for use with combines that will make possible twenty four hour per day operation of the machine, thus making full use of the time for harvesting but at the same time putting the crop into proper condition for market and storage.

Still another object of this invention is to provide a crop dryer for use with combines and the like, that will initially dry off the surface moisture which will permit operation at any hour of the day, and that will reduce the hygroscopic moisture of the grain after threshing to the desired requirement to put it in better condition for marketing.

Yet another object of the present invention is to provide a dryer or dehydrator for crops that acts on the crop at each step of the harvesting operation, so when the crop, both the grain and the cuttings have been harvested it is ready for its ultimate use, that is the cuttings may be baled and the grain marketed or stored.

A further object of this invention is to provide a dryer or heater for discharging hot air or the gaseous products of combustion and/or other gases for treating the crop cuttings and the seeds to be threshed therefrom for the extermination and control of certain insects that are present or that prey upon the crop cuttings or the seeds thereof.

A still further object of this invention is to provide a dryer for use with combines that is simple in construction, easy to install and operate, which may be attached to any type of combine, and which is adaptable to varying conditions of installation and operation.

An embodiment of this invention is illustrated in the accompanying drawings, in which like reference characters designate like parts in the several views, in which:

Fig. 2 is a fragmentary elevational view of a combine with parts broken away and shown in section, and showing a longitudinal view of the drying units as installed thereon;

Fig. 7 is a fragmentary vertical sectional view, with parts broken away, of a modified form of the grain receiving hopper, showing a screw conveyor installed therein;

Fig. 8 is a sectional view taken on the line 8—8 of Fig. 7, looking in the direction indicated by the arrows; and Fig. 9 is a fragmentary sectional view taken on the line 9—9 of Fig. 7, looking in the direction indicated by the arrows.

Figure 1:
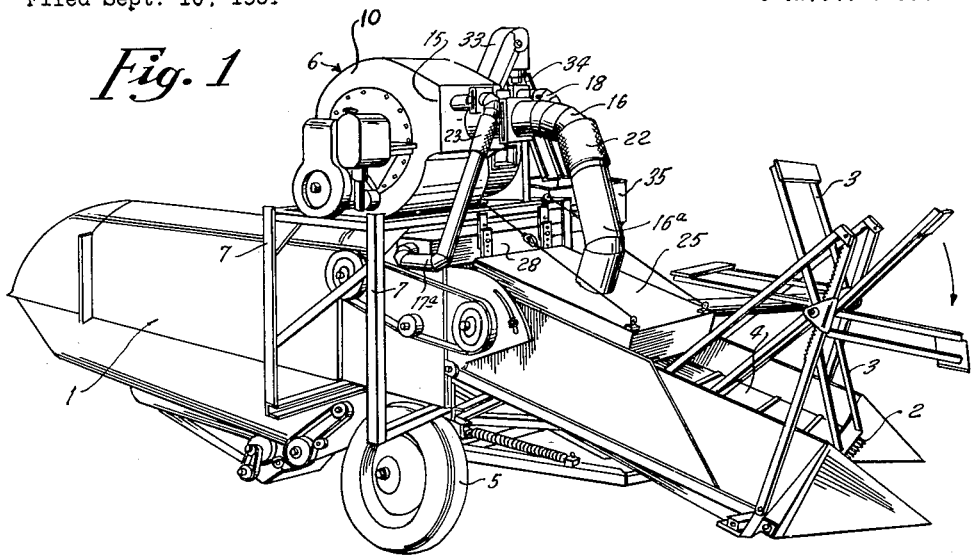
Fig. 1 is a perspective view taken from above the device showing the front and side of a combine with the present invention installed thereon.
Figure 3:
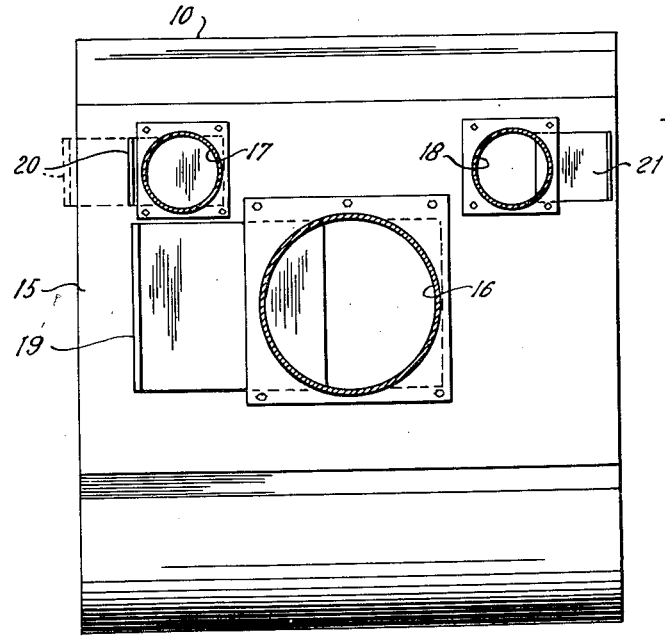
Fig. 3 is a sectional view taken on the line 3—3 of Fig. 2, looking in the direction indicated by the arrows.

With more detailed reference to the drawing, the numeral 1 generally designates a combine of general structure, since the dryer unit may be used on practically any type of combine. The combine is therefore described in very general terms and only the essential structure is recited.

The combine has the usual sickle 2, which sickle is driven by the power drive, not shown, of the combine. The grain or crop is cut by the sickle 2, and is brought into position for cutting by means of a reel 3, which is operated in a conventional and well known manner. After the grain is cut or headed, it falls on a conveyor 4, which conveyor in the present instance is shown to be a belt type conveyor.

In the present instance, the combine is mounted on wheels 5 so it may be drawn behind a traction element, although the drying unit may be installed on a combine of the self-propelled type.

The dryer, generally designated at 6, is mounted on a frame work 7 so that the dryer will be positioned above the combine 1. The frame work 7 may be secured to the combine by any suitable means, such as by welding, by bolts or the like.

Figure 4:
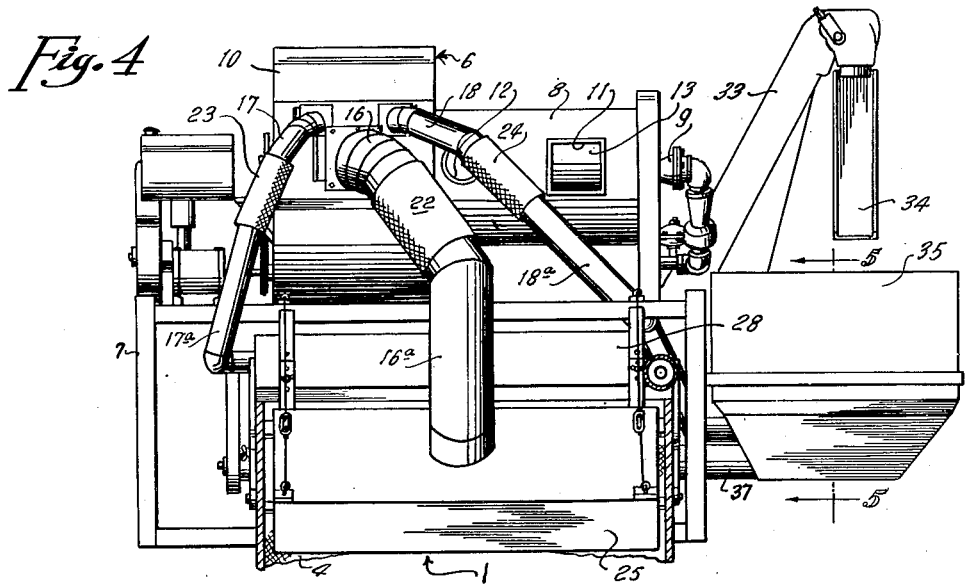
Fig. 4 is a front elevational view of a combine with parts thereof broken away and with parts shown in section, and showing the invention installed thereon.

The drying unit 6, as will best be seen in Figs. 1, 2, and 4, is of the general character set forth in my copending application Ser. No. 224, 269, Portable Dehydrators, now Patent No. 2,703,706, and embodies the mechanical features of a combustion chamber, a blower fan, a burner, burner controls and a power drive element, substantially as shown in the above mentioned application. A sufficiently complete disclosure is made herein, however, to show the manner in which the drying element is adapted to combines and how it is used to dry or dehydrate the grain and cuttings at the various stages of their processing.

The drying unit 6 has a combustion chamber 8 with a burner 9 installed in one end thereof. A blower fan housing 10 is secured to the end of the combustion chamber opposite the burner.

The burner 9 is of the type that generates high, intense heat within the relatively short combustion chamber 8, which combustion chamber has a primary air inlet 11 near the burner end thereof, and secondary air inlets 12, only one of which is shown, are disposed on the the opposite sides of the combustion chamber 8. The combustion chamber has an inner tubular member 13 therein, that terminates slightly short of the diametrically disposed secondary air inlets 12 so as to prevent impingement of the flame generated by the burner 9 against blower fan blades 14.

The combustion chamber 8 is of the type that preferably uses butane, propane or other low pressure gases that are used for commercial and industrial heating, and the burner is of the type that produces an intense flame within the inner tubular member in the combustion chamber, and when the air is drawn in through primary air inlet 11, it is initially heated by contact with the inner tubular member 13, and as the air progresses within the annular space formed between the housing of the combustion chamber 8 and the inner tubular member 13, it progresses to a point where a pair of diametrically opposite inlet openings 12 are positioned, and where the inner tubular member terminates, whereupon the air that has been drawn in through opening 11 is mixed with the products of combustion, and the secondary air that enters through the secondary air inlets 12 prevents any further extension of the flame within the inner tubular member 13 toward the fan. Therefore the heated air and the products of combustion are discharged into the blower fan housing 10 at a very high temperature, therefore the air that is discharged out through ducts 16, 17 and 18 may be of such temperature as to quickly dehydrate the cuttings and the grain being processed, but not sufficiently hot to cause spontaneous combustion or to scorch the cuttings or to destroy the germination properties of the grain or seed that is threshed from the cuttings.

The temperature of the combustion chamber and of the air being discharged from the blower fan housing may be controlled as disclosed in my co-pending application mentioned above, so as to give maximum efficiency to the process.

The fan housing 10 has a transition duct 15 covering the discharge opening of the fan housing 10 so as to selectively discharge heated air into the ducts 16, 17 and 18. Each of these ducts has blast gates 19, 20 and 21, respectively, which are of the slide valve type for regulating the amount of air that may pass from the transition duct 15 into any of the ducts 16, 17 or 18. Each of the ducts 16, 17 and 18 has a flexible sleeve, 22, 23 and 24 respectively, which may be fabric or flexible metal hosing. Connected to the flexible sleeves 22, 23 and 24 are the respective extensions 16a, 17a and 18a leading to the various parts of the combine to which hot air is to be directed for treating the grain and cuttings during the process of harvesting.

The duct extension 16a leads to a box or air directing hood 25 which hood has elongated perforations 26 on the lower side thereof so that hot air may be directed therethrough to be discharged outward onto conveyor belt 4 so as to initially dry the material thereon being elevated, such as grain and the like, before this grain passes into the threshing mechanism, generally known as a beater or cylinder 27.

Super-heated, high velocity air is introduced into the heater compartment 27a by means of a transverse header 28, which header has elongated slots formed along the bottom thereof for directing hot air outward therethrough, which air is introduced into the header by the duct extension 17a that is connected between the duct 17 and the transverse header.

The duct 17a connects with an end of header 28, which header has the elongated slots or openings 29 formed in the bottom thereof through which hot air is directed outward. The hot air is first sent out from the fan housing through duct 17 and 17a into heater housing 27a for the initial drying of the crop being cut. This drying affects the whole stalk, but it is particularly desirable for dehydrating the husks that hold the grains or seeds. When these give up moisture they become loosened so that when the grain goes into the threshing mechanism the seed is more readily separated therefrom by the action of the beater 27 in a manner well known in the threshing art.

With the grain passing beneath the hood 25, which is emitting hot air, and through the chamber 27a, the cuttings are also dried and discharged rearwardly with the moisture content thereof reduced sufficiently to make immediate baling possible, or otherwise processing the residue cuttings, as desired.

Figure 5:
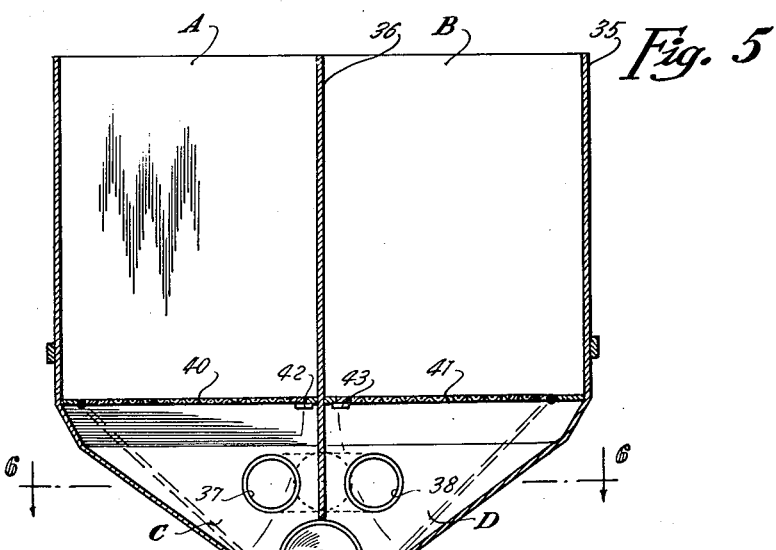
Fig. 5 is a sectional view taken on the line 5—5 of Fig. 4, looking in the direction indicated by the arrows.

The threshed grain is sifted through the cleaner screen 30 into conveyor trough 31 and is discharged by means of a screw conveyor 32 onto elevating conveyor 33 that elevates the grain upward and out through trough 34 into a grain receiving bin or hopper 35, which hopper may have a partition 36 therein, as shown in Fig. 5. The grain discharged from trough 34 may be selectively discharged into compartment A or compartment B formed at each side of the partition. The hot air being exhausted through duct extension 18a may be selectively directed into duct 37 or 38 by the manipulation of a swing valve 39.

A screen bottom 40 and a screened bottom 41 are provided for the respective compartments of the hopper and are hinged thereto near the respective lower ends thereof, and are held in horizontal position by the respective latch members 42—43. With the compartment A filled with grain the valve 39 is turned so as to deliver hot air up through the screen 40 until the moisture content of the grain is sufficiently reduced. The chute or trough 34, in the meantime, has been moved to deliver grain into compartment B, and the valve 29 is turned so as to deliver hot air up through screen 41 into compartment B. With the grain in compartment A sufficiently dry, the latch 42 is released and the grain in compartment A is discharged into compartment C, whereupon a screw conveyor 44 will discharge the grain from the compartment into a loading conveyor. A similar series of steps take place with respect to the grain in compartment B.

Figure 6:
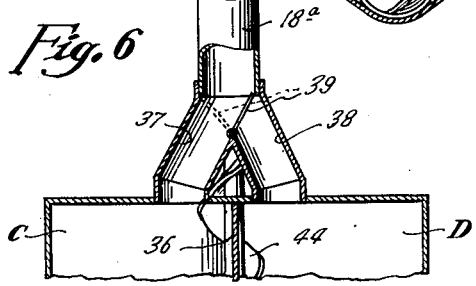
Fig. 6 is a fragmentary sectional view taken on the line 6—6 of Fig. 5, looking in the direction indicated by the arrows.

After the grain or seeds have been discharged from compartments A and C, the screen bottom 40 is elevated into the position as shown in Fig. 5 and retained in that position by means of the latch 42 to enable refilling of compartment A. Then the swing valve 39 is swung to the position as shown in dashed outline in Fig. 6 so as to divert the hot air through duct 38 into compartment D and thence the hot air will be discharged up through compartment B and upward through screen 41 and through seeds or grain contained in compartment B, until the moisture content thereof is reduced the desired amount.

A latch 43 is provided for retaining screen bottom 41 in a horizontal position, as shown in Fig. 5. The seeds or grain are discharged from compartment B into compartment D in the same manner as described above for compartment A.

*Operation*

In the operation of the device, the structure of which is described above, the combine is drawn across the terrain by means of a tractor or other power means. With the reel 3 turning in the direction as indicated by the arrow, the crop being cut by the sickle 2 will be directed onto the elevator 4 and with the burner 9 generating heat within the combustion chamber 8, and directing it into inlet opening of the blower fan housing 10, the fan 14 will discharge hot air into transition duct 15 and with the draft gates 19, 20 and 21 open, hot air will be discharged into the respective hot air ducts 16, 17 and 18 and thence into the respective extension ducts 16a, 17a and 18a, and with the cut crop which has the grain or seeds therein passed under hood 25, air which has been raised to a high temperature in the combustion chamber, will be discharged onto the cuttings so as to dehydrate the same, which will cause the loosening of the hulls or husks from the grain or seeds and thus facilitate the threshing thereof, without loss of grain. This step of the process also reduces the moisture content of the grain itself, which moisture is passed out into the air.

After the grain has passed from beneath the hood 25 into beater chamber 27a, high velocity hot air is discharged from openings 29 downward through the cuttings and seeds to cause a drying action thereon, which will cause the husks to loosen from the grain which will enable the beater 27 to dislodge the grain from the cuttings. The grain and the cuttings are then discharged from beater chamber 27a onto cleaner screen 30, whereupon, the seeds are sifted downward therethrough and onto screw conveyor compartment 31 and thence onto conveyors 32 and 33 for discharge to trough 34 into hopper 35.

The cuttings are discharged rearward through the combine and directed into a baler, not shown, for immediate baling, if desired or it may be otherwise processed in the same manner as any dried hay.

The seeds that are discharged into the hopper 35 are heated by a blast of hot air from the duct 18a which may be directed into either compartment A or compartment B of the hopper 35 by adjustment of swing valve 39 which operates to close duct 38 while the hot air is being discharged through duct 37 into compartment A and to close duct 37 while hot air is being discharged into duct 38 leading to compartment B. Hot air may be discharged into either of the compartments, as described above, or into both of the compartments at the same time, in whatever proportion may be desired, by swinging the swing valve 39 in any position intermediate that shown in full outline and that shown in dashed outline in Fig. 6. However, it is preferable to dehydrate or evaporate the hygroscopic moisture from the grain in one compartment, while the other compartment is being filled. The air is discharged upward from compartment C or D into the respective compartment A or B through the respective screen bottoms 40 and 41. After the grain or seed has been heated to the desired temperature and dehydrated a sufficient length of time, the hinged screen bottom member 40 or 41 is released by releasing latch 42 or 43 to discharge the contents from the respective compartment A or B into compartments C and D respectively, thereby enabling a screw conveyor 44 to discharge the grain therefrom onto the loading conveyor.

With the use of the apparatus and system herein disclosed, grain may be cut before it is atmospherically dried and while the seeds are still securely held in the heads, and the drying process carried out during the harvesting of said grain. Any desired degree of dehydration may be obtained, much higher than would be feasible if atmospheric drying were relied upon, as in the latter case, much grain would be lost by shattering before or during harvesting, thus cutting down on the crop recovery.

Furthermore, any stand of grain is likely to ripen unevenly, and thus some parts of the field will be ready to harvest when others are not, or some may be over-ripe before others are ready to cut, if the maturing of the grain is left to natural conditions.

By the use of the present device, all the element of chance is removed from the maturing of the grain and of the weather conditions, thus the crop recovery can be practically complete, and the condition of the grain and cuttings may be whatever is desired, or whatever the marketing requirements indicate.

With the present device the crop may be cut or harvested while still wet from dew, frost or even rain, at any time, even on days when the relative humidity is high, thereby making it possible to operate the machine twenty four hours a day, thus making full use of the machine, the time, and the condition of the crop, the time of the harvesting is dictated by the conditions other than the maturity of the crop.

The cuttings thus processed produce a hay of higher quality than if allowed to mature in the fields, lying two or three days after being cut, or a number of weeks as the case may be, as has heretofore been the practice.

It is to be understood that while the invention has been described in some detail above, and in a modification indicated hereinafter, that changes may be made in the minor details of construction and adaptations made to different installations, without departing from the spirit of the invention as set forth in the appended claims.

*Modification*

The modified form of the grain receiving bin or hopper of the invention is shown in Figs. 7, 8 and 9, which has a single compartment 51 that is open at the top, as indicated in Fig. 8. The hopper is preferably rectangular in shape and has screen doors 52 hingeably connected near the bottom portion thereof by means of hinges 53. Latches 54 are provided for retaining the doors 52 in a closed position. An upright, centrally positioned, vertical casing 55 contains a recirculating screw elevator conveyor 56 which is rotatably mounted therein, which casing 55 is mounted at its lower end on a transverse member 57 and is stabilized by a transverse brace 58 secured to opposite sides of the hopper 51 and to a diverter shield 59. The screw conveyor shaft 60 is journaled on the transverse member 57 and transverse base member 58 and is driven by a gearing 61.

The vertical elevator casing 55 has openings 62 formed in the lower end to admit grain or seeds into vertical elevator casing 55. The upper end of the housing has a frustro-conical diffuser 63 mounted immediately below the diverter shield 59 so that upon rotation of recirculating screw elevator, the grain or seeds will be discharged onto the top portion of the diffuser 63 and discharged off the periphery thereof. An air duct 64 comparable to the air duct 18a and shown in Fig. 6, leads from transition duct to air duct 65, as will best be seen from Figs. 7 and 9. This discharges the hot air below the screen bottom member 52 so the hot air will pass upward through the hopper 51 and the grain therein for lowering the moisture content of the grain contained in the hopper, and since the grain or seeds at the bottom of the hopper become heated more quickly, this seed or grain finds its way into openings 62 and is elevated by recirculating elevator 56 and discharged onto diffuser 63 to be mixed with the incoming grain from the trough 34.

The level of the grain in the hopper will normally be maintained below the lower edge of the diffuser plate 63 so that the grain that is discharged off the lower edge will be aerated and the hot air passing upward through the grain within the hopper will cause rapid evaporation of the moisture from said grain. After the hopper becomes sufficiently full and the grain has been recirculated a sufficient length of time, the screen doors 52 are released by releasing latch 54 to swing down to discharge the grain from the hopper 51 into a compartment 66 to be discharged therefrom by a screw conveyor 67 onto a loading conveyor not shown.

The shaft 68 of the screw conveyor 67 may connect with a suitable source of power not shown on the combine and a belt 69 may be provided to pass over the pulleys 70 and 71 to drive the shaft 72.

It is evident from the above description that the recirculated grain in the hopper may be thoroughly dried before it is discharged therefrom.

Having thus described the above invention, what is claimed is:

1. A harvester for harvesting moist crops for delivery to a thresher, comprising a crop cutting means, a crop receiving and conveying means arranged adjacent thereto, a drying unit including an air heating means and an air blowing means, an air directing hood having air outlets directed at the said crop receiving and conveying means, and a duct connecting said hood and said heating and blowing means.

2. A harvester for harvesting moist crops for delivery to a thresher, comprising a crop cutting means and a crop receiving and conveying means arranged adjacent thereto, a drying unit including an air heating means and an air blowing means, an air directing hood having air outlets in the lower portion thereof arranged over said crop receiving and conveying means, and a duct connecting said hood and said heating and blowing means.

3. An apparatus as set forth in claim 2, and whereby said thresher has a housing, having a beater means mounted therein, positioned at the discharge end of said crop receiving and conveying means, a second duct leading from said blowing unit to said beater housing to direct heated air into said beater housing.

4. An apparatus as set forth in claim 2, whereby said thresher has a housing, having a beater means mounted therein, positioned at the discharge end of said crop receiving and conveying means, a cleaner screen disposed at the discharge end of said beater housing to separate grain from chaff, a grain receiving bin disposed in position to receive grain from said separator screen, conveyor means in said bin to circulate said grain therein, and a second duct means connecting said blowing unit and said grain receiving bin to direct heated air into said grain receiving bin.

5. An apparatus as set forth in claim 2, whereby said thresher has a housing, having a beater means mounted therein, disposed at the discharge end of said crop receiving and conveying means, a cleaner screen disposed at the discharge end of said beater housing to separate grain from chaff, a grain receiving bin disposed in position to receive grain from said separator screen, said grain receiving bin having an elevator conveyor means therein, which elevator conveyor means has a grain discharge at the upper end thereof, said grain being elevated to the upper portion of said bin, a second duct connecting said blowing unit and said grain bin to direct heated air through said grain as it passes downward in said bin from said elevator conveyor means.

6. An apparatus as set forth in claim 2, whereby said thresher has a housing, having a beater means mounted therein, positioned at the discharge end of said crop receiving and conveying means, a cleaner screen disposed at the discharge end of said beater housing to separate grain from chaff, a grain receiving bin disposed in position to receive grain from said separator screen, said grain receiving bin having a centrally disposed elevator conveyor means therein, which elevator conveyor means has a grain discharge at the upper end thereof, a diffuser plate secured near the upper end of said elevator conveyor means so as to spread said grain as it is discharged from said elevator conveyor means, and a second duct means connecting said air blowing means and said grain receiving bin to direct heated air through said grain as it passes downward off said diffuser plate.

7. An apparatus as set forth in claim 2, whereby said thresher has a housing, having a beater means mounted therein, positioned at the discharge end of said crop receiving and conveying means, a second duct leading from said blowing unit to said beater housing to direct heated, high velocity air into said beater housing, a cleaner screen disposed at the discharge end of said beater housing to separate grain from chaff, a grain receiving bin disposed in position to receive grain from said separator screen, said grain receiving bin having a centrally disposed elevator conveyor means therein, which elevator conveyor means has a grain discharge at the upper end thereof, an outwardly and downwardly sloping diffuser plate secured near the upper end of said elevator conveyor means so as to spread said grain as it is discharged from said elevator conveyor means, and a third duct connecting said blowing unit and said grain bin so as to direct heated air through said grain as it passes downward off said diffuser plate.

References Cited in the file of this patent

UNITED STATES PATENTS

| | | |
|---|---|---|
| 844,627 | Sylvester | Feb. 19, 1907 |
| 1,565,282 | Mabee | Dec. 15, 1925 |
| 1,662,431 | MacGregor | Mar. 13, 1928 |
| 1,720,573 | Roberts, Jr. | July 9, 1929 |
| 2,397,363 | McLeod | Mar. 26, 1946 |
| 2,465,070 | Demuth | Mar. 22, 1949 |
| 2,513,480 | Heth | July 4, 1950 |